United States Patent [19]

Bartlett et al.

[11] Patent Number: 4,753,128
[45] Date of Patent: Jun. 28, 1988

[54] ROBOT WITH SPRING PIVOT BALANCING MECHANISM

[75] Inventors: Donald S. Bartlett, Troy; David I. Freed, Lake Orion; William H. Poynter, Jr., Clinton Township, Macomb County, all of Mich.

[73] Assignee: GMF Robotics Corporation, Auburn Hills, Mich.

[21] Appl. No.: 23,691

[22] Filed: Mar. 9, 1987

[51] Int. Cl.⁴ .................... B66C 23/72; B25J 19/00; F16F 1/06

[52] U.S. Cl. ........................... 74/469; 16/1 C; 248/292.1; 267/72; 403/131; 901/48

[58] Field of Search .............. 74/469; 16/1 C; 49/386; 248/292.1, 280.1, 123.1, 665; 267/71, 72; 403/131; 901/48

[56] References Cited

U.S. PATENT DOCUMENTS

| | | | |
|---|---|---|---|
| 2,184,294 | 12/1939 | Fergueson | 74/582 X |
| 2,547,532 | 4/1951 | Mendelsohn | 248/292.1 |
| 4,350,382 | 9/1982 | Spronck | 49/386 |
| 4,500,251 | 2/1985 | Kiryu et al. | 901/48 X |
| 4,546,233 | 10/1985 | Yasuoka | 901/48 X |
| 4,598,601 | 7/1986 | Molaug | 901/48 X |
| 4,653,975 | 3/1987 | Akeel | 901/48 X |
| 4,659,280 | 4/1987 | Akeel | 901/48 X |

FOREIGN PATENT DOCUMENTS 2027115 2/1980 United Kingdom ............... 403/131

Primary Examiner—Allan D. Herrmann
Attorney, Agent, or Firm—Brooks & Kushman

[57] ABSTRACT

A robot including a balancing mechanism or balancer with a compression spring which flexes to compensate for the gravitational moment between an arm assembly and a base of the robot. The compression spring is chosen to have a force-deflection characteristic to account for the gravitational moment and the geometry of the mechanism. The arm assembly has a pivotal connection which pivotally supports the arm assembly on the base of the robot for movement about a pivotal axis. The mechanism can be adjusted for various arm assembly lengths and/or payloads. The mechanism includes a spring support, a connecting rod having a longitudinal axis and connected to the spring support for communicating motion of the spring support to the arm assembly at an attachment point offset from the pivotal axis. The resulting balancing mechanism is relatively compact, which lends itself to robotics applications where space is limited.

19 Claims, 2 Drawing Sheets

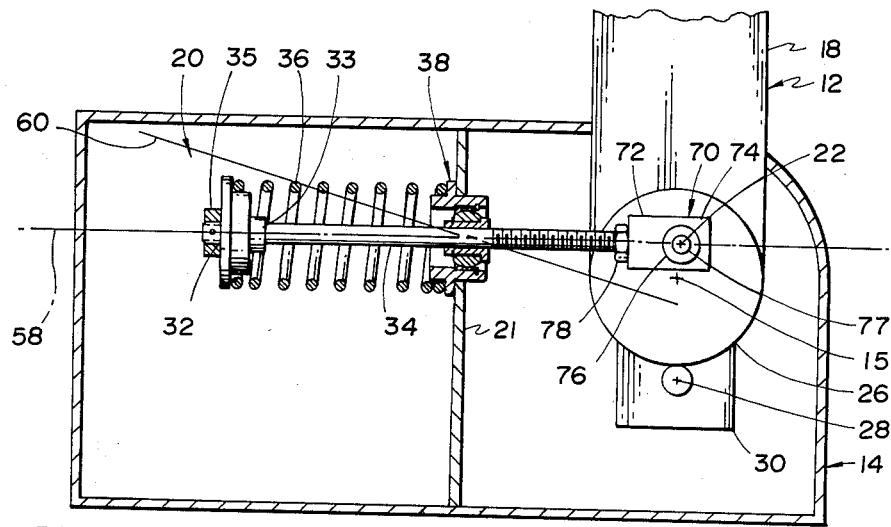
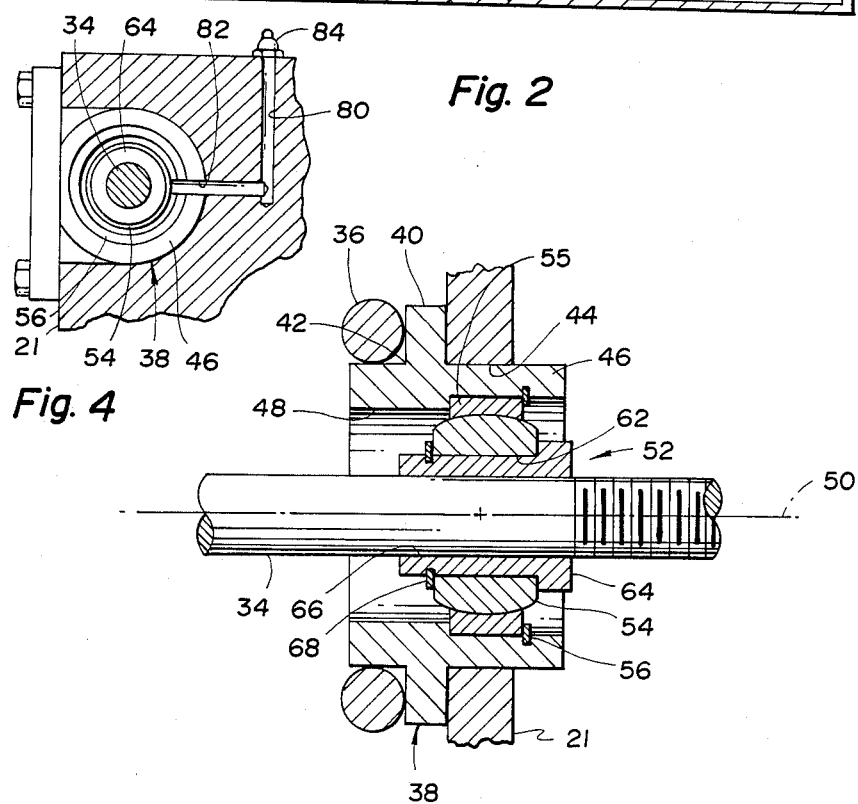

ROBOT WITH SPRING PIVOT BALANCING MECHANISM

TECHNICAL FIELD

This invention relates to robots having counterbalance mechanisms and, in particular, to robots having articulated and/or hinged arms which must be balanced to compensate for the effects of gravity.

BACKGROUND ART

A balancer is a device used to counteract the force of gravity for hinged and/or articulated arm robots when such robots are likely to be activated manually or by some lower level power source. Such an occurrence typically takes place during teaching. Elimination or reduction of the effects of gravity allow the use of smaller power sources which reduces energy utilization and allows for better stability of servo-controlled mechanisms, such as the robot arm. With a balancer mechanism, articulated arm robots can be designed so that they can be manually led through their desired tasks without the use of a prime mover and the complexity associated with the control of the robot. As a result, the robot arm can be manually led through each desired task under low level power requirements.

The use of such balancers permits the use of smaller motors and gears since these elements no longer support the weight of the arm. This is desirable from a cost standpoint and allows for a more compact design which, in turn, allows greater accessibility to the workspace.

The prior art shows numerous gravity balancing mechanisms used on articulated arms and hinge mechanisms. One such arrangement utilizes counterweights for balancing the robot arm. However, the use of counterweights is oftentimes objectionable because of the added mass and resulting increase in arm inertia. For example, the inertia of a counterweight must be overcome every time the robot arm is to be moved in a different direction. Braking and change of direction of the robot arm is subject to inertial deceleration and acceleration forces due to the counterweights.

The following prior art patents disclose the use of counterweights as counterbalance mechanisms: the U.S. Pat. Nos. 2,344,108; to Roselund, 3,543,989; to Cooper and 4,402,646 to Le Rouzo.

Other prior art patents disclose the use of hydraulic and pneumatic balancers of both the active and passive type. Active balancers require an external power source to supply or absorb the balancing energy. Passive balancers store and release the balancing energy as required. Many of such hydraulic or pneumatic counterbalance mechanisms are relatively complex and costly. For example, the patent to Panissidi, U.S. Pat. No. 4,229,136 discloses an air pressure counterbalance system including an air-driven piston operated in the direction of the gravity axis as the manipulator hand is raised and lowered. The weights of different tools are programmed into computer memory and thereafter an air pressure regulator adjusts the counterbalancing force depending upon which tools are used by the manipulator.

Other U.S. patents which disclose hydraulic or pneumatic counterbalancing mechanisms include the U.S. Pat. Nos. 3,370,452 to Sack et al and 4,300,198 Davini.

When balancing is required within a small angle or within a single quadrant (i.e. from a horizontal to vertically upward orientation) a level of balancing can be obtained with a tension spring or passive pneumatic balancer. The following prior art patents disclose tension spring balancers which are useful within small angles of movement: the U.S. Pat. Nos. 3,391,804 to Flatan; 4,024,961 to Stolpe; 4,259,876 to Belyanin et al; 4,283,165 to Vertut; and 4,378,959 to Susnjara.

One objection to the use of conventional tension spring balancers is that they do not adequately balance the gravitational load. Also, it is inherent in most spring balancing methods that complete balance is possible only for one or two configurations of the arm and spring combination. As the robot arm moves away from that configuration in either of two possible directions, an unbalance is generated and progressively changes until the arm approaches a neutral orientation of zero gravitational moment.

Tension spring balancers frequently do not provide an acceptable level of balancing over extended angular movement of the robot arm. Because of this, oftentimes there are high actuation power requirements to overcome the effects of gravity on the robot arm. Such high actuation power requirements present a safety hazard if the mechanism should fall under the force of gravity when motor power is shut off. Consequently, such mechanisms are usually provided with brakes to alleviate the potential danger, or are overbalanced against gravity.

Spring stiffness, initial tensioning and anchor point location can be adjusted to give a higher degree of balance within a small angular displacement of the arm and also limit the maximum value of the unbalanced moment and/or its direction. Beyond that displacement the degree of unbalance grows relatively rapidly.

Despite the relative simplicity and relative inexpensiveness of conventional tension spring and passive pneumatic balancers, the balancers have oftentimes not been able to overcome their current angular limitations.

It has been found that high force compression springs operating on small moment arms can overcome this angular limitation problem and offer better balance over the entire range of travel of the robot's arm. Such a balancer utilizes a high force compression spring for balancing the arm of a robot. The compression spring is located inside of a balancer can which houses the spring. One end of the spring rests on the end of the can and the other end of the spring rests on a piston. The force of the spring is transmitted between the can and the piston. A sleeve bearing is located at the point where a piston rod connected to the piston passes through the can. The sleeve bearing prevents excessive friction and wear between the rod and the can as the rod moves relative to the can.

A cap is mounted on the opposite end of the can. In turn, the cap is attached to a block by means of a shaft and a journal bearing. The journal bearing allows the cap to rotate relative to the block. The block is attached to a wall member or casting by means of a threaded fastener. As the arm of the robot is moved the compression spring is loaded to balance the weight of the arm. Examples of such balancers are described in U.S. Pat. Nos. 4,592,697; 4,653,975; and 4,659,280 to Tuda et al assigned to the Assignee of the present invention.

The balancer described immediately above has the following limitations; (1) the journal bearing must be relatively large to accommodate the high spring force and to survive with a very limited angle of rotation which makes lubrication difficult; (2) the can of the balancer must be large enough to have clearance with the spring to prevent the spring from rubbing on it; (3) the balancer is heavy thereby making service and maintenance more difficult; and (4) the length and width of the balancer are relatively large for the limited space available inside a robot.

DISCLOSURE OF THE INVENTION

An object of the present invention is to provide a robot with an improved balancing mechanism including a compression spring which is chosen to have a force-deflection characteristic which accounts for the gravitational moment and the geometry of the mechanism while at the same time reducing the cost, size and weight of the mechanism.

Another object of the present invention is to provide an improved balancing mechanism that balances an arm assembly of a robot during an extended range of movement of the arm assembly in a reliable and inexpensive fashion.

Still another object of the present invention is to provide a robot with an improved balancing mechanism which, given its performance characteristics, is relatively inexpensive, simple and easy to service.

In carrying out the above objects and other objects of the present invention, a robot constructed in accordance with the present invention includes a base, including a wall member and an arm assembly having a pivotal connection that pivotally supports the arm assembly on the base for movement about a pivotal axis. The robot also includes an end member and communicating means having alongitudinal axis and connected to the end member for communicating motion of the end member to the arm assembly at an attachment point offset from the pivotal axis. A compression spring is supported at one end thereof by the end member. Bearing means supported on the wall member between the end member and the attachment point is provided for supporting the communicating means for linear and rotary movement relative to the wall member. Spring support means supported on the wall member supports the opposite end of the spring and allows the spring to flex along the longitudinal axis during rotary movement of the communicating means. The spring is compressed between the end member and spring support means.

Preferably, the end member comprises a spring support and the communicating means comprises a connecting rod connected to the spring support at a first end of the connecting rod.

Also, preferably, the spring support means includes a second end member having an outer peripheral groove wherein the opposite end of the spring is received within the groove for compression between the first and second end members.

While not limited thereto, the spring preferably comprises a helical compression spring for storing energy in its coils and the connecting rod extends through the coils of the spring along its longitudinal axis.

Further in carrying out the above objects and other objects of the present invention, an energy-storing balancing mechanism constructed in accordance with the present invention is adapted for use with a robot and includes the above-noted end member, communicating means, compression spring, bearing means and spring support means.

The balancing mechanism as constructed above provides a relatively inexpensive and simple way of balancing a robot arm assembly during extended angular movement of the arm assembly. The above construction also minimizes the need for high actuation power requirements to overcome the effects of gravity acting on the arm assembly.

Other advantages of the present invention will be readily appreciated as the same become better understood by reference to the following detailed description when considered in connection with the accompanying drawings.

BRIED DESCRIPTION OF THE DRAWINGS

FIG. 2 is a side-elevational, sectional view of a base of the robot with an enclosed balancing mechanism constructed in accordance with the present invention;

FIG. 3 is an enlarged view of a portion of the balancing mechanism of FIG. 2; and FIG. 4 is a sectional end view of the portion of FIG. 3.

BEST MODE FOR CARRYING OUT THE INVENTION

Figure 1:
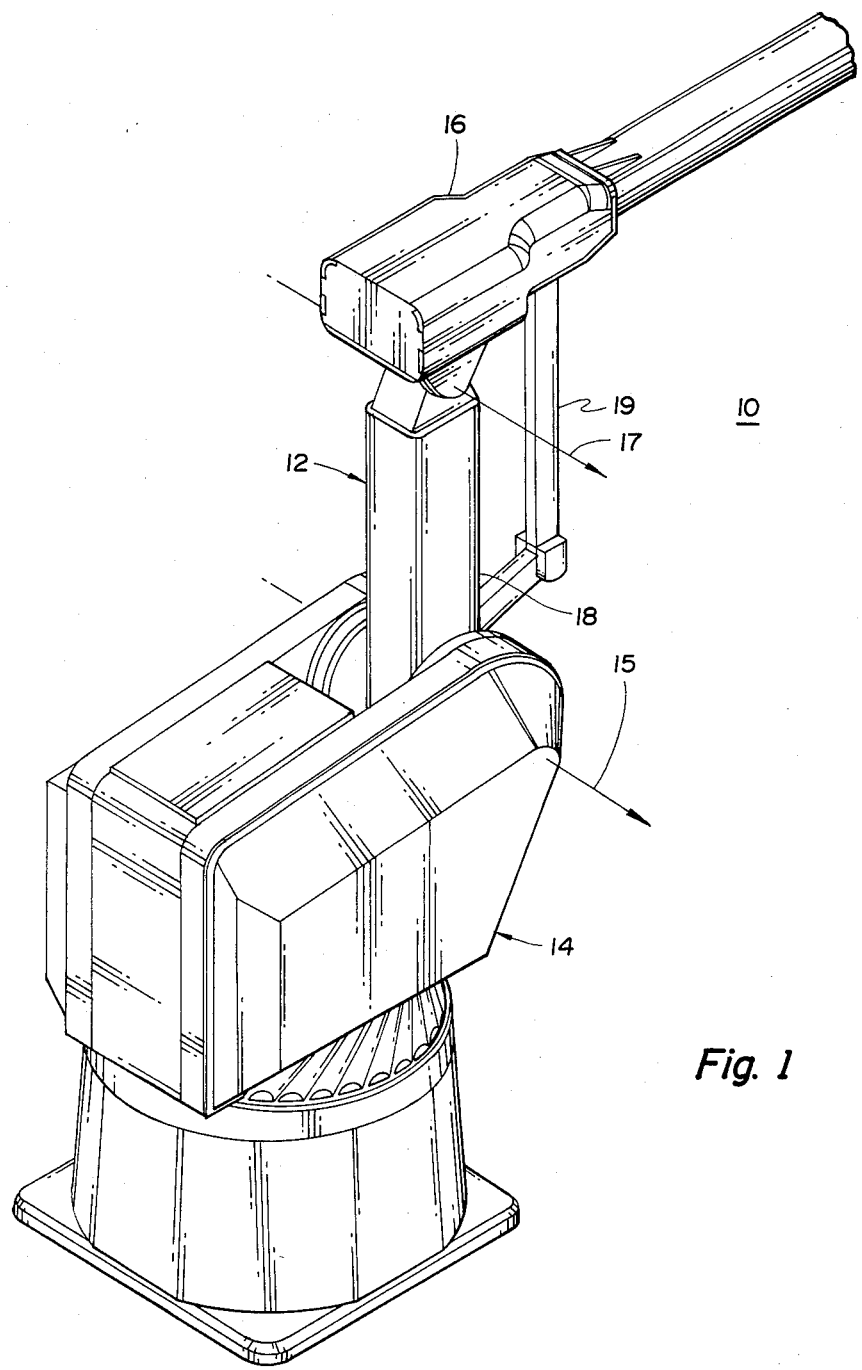
FIG. 1 is a perspective view, partially broken away, of a robot incorporating the present invention.

Referring now to the drawings, there is illustrated in FIG. 1 an articulated arm robot utilizing the invention as disclosed and claimed herein. The robot, collectively indicated at 10, includes an arm assembly generally indicated at 12 which has a pivotal connection which pivotally supports the arm assembly 12 on a base, generally indicated at 14. The arm assembly 12 pivots about a pivotal axis 15.

The arm assembly 12 includes an inner arm 18 and an outer arm 16 which is pivotally supported on the inner arm 18 for movement about an axis 17. Linkage 19 interconnects the inner and outer arms 18 and 16, respectively. A wrist mechanism (not shown) may be mounted on the free end of the outer arm 16 to support a tool at its free end thereof.

Referring to FIG. 2, the robot 10 also includes an energy-storing balancing mechanism, generally indicated at 20, supported on a wall member 21 of the base 14. The mechanism 20 is rotatably connected to the arm assembly 12 at an attachment point 22, offset from the pivotal axis 15 of the arm assembly 12. In particular, the mechanism 20 is rotatably connected to a bull gear 26 which, in turn, is fixedly attached to one end of the inner arm 18 to move therewith. The bull gear 26 is in driving engagement with a pinion 28, which is fixedly mounted on a drive shaft (not shown) of a drive motor 30 to thereby cause the inner arm 18 to rotate about the pivotal axis 15.

The mechanism 20 can be utilized to directly balance the outer arm 16 of the robot 10 by using a four bar linkage or chain to attach the outer arm 16 to the bull gear 26, as is well known in the art.

Referring to FIGS. 2 and 3, the mechanism 20 includes a first end member of spring support 32, a communicating means or connecting rod 34 and a high-force compression spring 36. One threaded end of the connecting rod 34 is connected to the spring support 32 by a nut 35 which is either welded or pinned on the end of the rod 34. The compression spring 36 is supported at one end thereof by the spring support 32 and at its opposite end thereof by a spring support means or second end member, generally indicated at 38. The spring support 32 includes a collar portion 33 to prevent rocking motion of the spring support 32.

The second end member 38 includes an outer peripheral flange 40, which at least partially defines an outer peripheral groove 42 in which the opposite end of the spring 36 is located. The compression spring 36 applies a force to the flange 40 of the second end member 38 to hold the second end member 38 against the wall member 21 about the outer periphery of an aperture 44 formed completely through the wall member 21. This eliminates the necessity for fasteners to retain the second end member 38 on the wall member 21.

The second end member 38 also includes a mounting portion 46 having an opening 48 extending completely therethrough. The connecting rod 34 extends completely through the opening 48 along its longitudinal axis 50.

A bearing means or mechanism, generally indicated at 52 is supported within the opening 48 between the first end member 32 and the attachment point 22 for supporting the connecting rod 34 for linear and rotary movement relative to the wall member 21. In particular, the bearing mechanism 52 includes a conventional spherical plain bearing 54 which is supported by a spherical bearing support 55 which, in turn, is fixedly mounted within the opening 48 by a large clip or snap ring 56 to permit limited rotary movement of the connecting rod 34 between a pair of extreme positions 58 and 60 as shown in FIG. 2.

The spherical bearing 54 has a hole 62 extending completely therethrough to receive and retain therein a sleeve bearing 64 of the bearing mechanism 52. The sleeve bearing 64 has a cylindrical passage 66 extending completely therethrough for slidably supporting the connecting rod 34 therein. A small clip ring 68 is provided for mounting the sleeve bearing 64 within the hole 62 to permit the connection rod 34 to translate relative to the wall member 21.

The spring force of the compression spring 36 is transmitted to the second end member 38 and, consequently, the spherical bearing 54 does not support any of the spring load. At the same time, the spherical bearing 54 allows the connecting rod 34 to rotate relative to the wall member 21.

The end of the connecting rod 34 opposite the piston 32 is threadedly and adjustably attached to a rod end casting, or adjustment means or mechanism, generally indicated at 70. The adjustment mechanism 70 includes an internally threaded connector portion 72 into which the end of the connecting rod 34 is adjustably and threadedly connected.

The adjustment mechanism 70 also includes a bearing support portion 74 inside which a rod end bearing or second bearing means 75 is located for permitting relative rotation between the connecting rod 34 and the bull gear 26 of the arm assembly 12. A pin 77 fixedly connected to the bull gear 26 is rotatably supported by the bearing 76. The rod end bearing 76 preferably comprises a self-aligning roller bearing. The roller bearing 76, in conjunction with the spherical bearing 54, allows for angular and parallel misalignment of the two bearings 76 and 54 relative to each other and, consequently, the mechanism 20 is not sensitive to either parallel or angular misalignment of the two bearings 54 and 76. Such misalignment might otherwise result in binding and excessive wear.

The mechanism 20 also includes a locking means or mechanism, which preferably comprises a lock nut 78, which is threadedly mounted on the connecting rod 34 adjacent the connector portion 72. The lock nut 78 accomplishes two different functions. The first function of the lock nut 78 is to jam against the internally-threaded connector portion 72 to prevent rotation of the connecting rod 34 relative to the adjustment mechanism 70. The second function of the lock nut 78 is to push up against the sleeve bearing 64 to preload the spring 36 to allow the mechanism 20 to be safely installed or removed from the rest of the robot 10.

Referring to FIG. 4, there is illustrated the mechanism for lubricating the spherical bearing 62. Lube holes 80 and 82 are drilled in the wall member 21 and the end member 38, respectively. The lube hole 80 is fitted with a grease fitting 84. The grease lubricates a groove on the outer diameter of the bearing 62 and a groove on the outer diameter of its ball. A flat on the end member 38 is flush with a surface of the wall member 21 when the holes 80 and 82 are aligned.

The distance that the adjustment mechanism 70 can be threaded onto the connecting rod 34 can be adjusted to vary the spring force to optimize the balancing for different robot arm lengths as well as for different masses. The nut 35 allows the above adjustment without disturbing the end member 38 or the alignment of the lub holes 80 and 82 after the lock nut 78 is loosened. In this way the nut 35 and, consequently, the piston rod 34, can be rotated to thereby adjust the mechanism 20 for different payloads.

The balancing mechanism 20 provides numerous advantages. For example, the design of the balancing mechanism 20 eliminates many parts which, consequently, reduces the length and width of the balancer package which, in turn, reduces the size of the base 14 into which the balancer mechanism 20 must fit. The reduction of parts also reduces the cost of the mechanism 20. Elimination of the parts also reduces the weight of the balancer which, in turn, aids installation and service of the mechanism 20.

Also, the second end member 38 transmits the spring force to the wall member 21 eliminating the need for an expensive journal bearing which must be designed to accommodate the full spring force. In contrast, the spherical bearing 54 of the present invention has relatively small force acting on it because the spring force is transmitted directly to the wall member 21. The spherical bearing 54 also has a longer life than the prior art journal bearings because of the reduced forces acting on it. Also, because the spherical bearing 54 is located relatively close to the rod end bearing 76, the angle of rotation of the spherical bearing 54 is larger than that of the prior art journal bearing. Lubrication of the spherical bearing 54 is thereby improved since a greater surface area of the spherical bearing 54 comes in contact with its lubrication grooves. This, in turn, increases the life of the spherical bearing 54 relative to the prior art journal bearing.

The present design also eliminates the need for a balancer can which, in turn, eliminates the possibility of the spring 36 rubbing on the can, thereby wearing out the spring and the can. Rubbing also causes noise, which reduces customer confidence in the robot. Elimination of the can also allows better access to the balancer for inspection and adjustment.

Finally, the mechanism 20 can be easily adjusted.

In the illusrated preferred embodiment, the compression spring 36 is illustrated as an energy storing element. The spring is chosen so that the resulting spring balancing torque closely approximates the gravitational torque of the arm. In the application illustrated, preferably the spring 36 is capable of providing 2000 pounds of force, is made from ⅜" wire and has coils 4½" in diameter. Obviously, other compression springs can be provided in other applications.

Other factors to consider in choosing a spring are the spacing between the pivot axis 15 and the attachment point 22 and the gravitational moment of the arm assembly 12. In the application illustrated, preferably the spacing is on the order of 2". This relatively small spacing means that the spring deflection during operation is small, giving a relatively constant force and good balancing characteristics.

The invention has been described in an illustrative manner and, it is to be understood, that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than has been described.

What is claimed is:

1. A robot comprising:
a base including a wall member;
an arm assembly having a pivotal connection that pivotally supports the arm assembly on the base for movement about a pivotal axis;
an end member;
communicating means having a longitudinal axis and connected to the end member for communicating motion of said end member to said arm assembly at an attachment point offset from the pivotal axis;
a compression spring supported at one end thereof by said end member to move therewith;
bearing means supported on the wall member between the end member and the attachment point for supporing said communication means for linear and rotary movement relative to said wall member; and
spring support means supported on the wall member for, in turn, supporting the opposite end of said spring at a fixed position relative to the wall member so that said spring flexes along the longitudinal axis during rotary movement of said communicating means relative to the opposite end of the spring, said spring being compressed between said end member and said spring support means, and the force of the spring being transmitted directly to said wall member by said spring support means.

2. The robot as claimed in claim 1 wherein said wall member has an aperture extending completely therethrough and wherein said spring support means includes a second end member having an outer peripheral flange disposed about the aperture, said flange at least partially defining an outer peripheral groove, one end of said compression spring being received within said groove.

3. The robot as claimed in claim 1 wherein said arm assembly includes a gear pivotally mounted for rotation about the pivotal axis and wherein said communicating means is rotatably connected to said gear at the attachment point for movement therewith about the pivotal axis.

4. The robot as claimed in claim 3 further comprising second bearing means connected to the gear for permitting relative rotation between the communicating means and the gear.

5. The invention as claimed in claim 4 or claim 18 wherein said second bearing means comprises a self aligning roller bearing.

6. An energy-storing balancing mechanism adapted for use with a robot having a base, an arm assembly and a pivotal connection with pivotally supports the arm assembly on the base for movement about a pivotal axis, the mechanism comprising:
an end member;
communicating means having a longitudinal axis and connected to the end member for communicating motion of said end member to the arm assembly and adapted to be connected to the arm assembly at an attachment point offset from the pivotal axis;
a compression spring supported at one end thereof by said end member to move therewith;
bearing means for supporting said communicating means for linear and rotary movement relative to the base; and
spring support means adapted to support the opposite end of the spring at a fixed position relative to the base for allowing the spring to flex along the longitudinal axis during rotary movement of the communicating means relative to the opposite end of the spring, the spring being compressed between said end member and said spring support means, and the force of the spring being transmitted directly to the base by said spring support means.

7. The invention as claimed in claim 1 or claim 6 wherein said communicating means comprises a rod connected to the end member at a first end of the rod.

8. The invention as claimed in claim 7 wherein said spring support means includes a second end member having an outer peripheral groove, the opposite end of said spring being received within said groove.

9. The invention as claimed in claim 8 wherein said second end member includes a mounting portion having an opening, said rod extending completely through the second end member, wherein said opening is sized to permit the rotary motion of said rod relative to said mounting portion.

10. The invention as claim in claim 9 wherein said bearing means includes a spherical bearing supported within said opening for permitting said rotary movement.

11. The invention as claimed in claim 10 wherein said spherical bearing has a hole extending completely therethrough and wherein said bearing means includes a sleeve bearing mounted within said hole and having a cylindrical passage extending completely therethrough, said rod being slidably supported within said cylindrical passage.

12. The invention as claimed in claim 8 wherein said spring comprises a helical spring having coils and wherein said rod extends through the coils of said spring.

13. The invention as claimed in claim 7 including adjustment means for varying the effective length of said rod between said end member and the attachment point to vary the spring force.

14. The invention as claimed in claim 13 wherein said adjustment means includes an internally threaded connector and wherein a second end of the rod is adjustably, threadedly connected to the connector.

15. The invention as claimed in claim 14 including locking means threadedly mounted on the second end of the rod to prevent relative rotation between the rod and the connector after adjustment thereof.

16. The invention as claimed in claim 13 wherein said adjustment means includes a bearing support portion and wherein said invention further comprises second bearing means supported on said bearing support portion for permitting relative rotation between the rod and the arm assembly.

17. The invention as claimed in claim 16 wherein said second bearing means comprises a self aligning roller bearing.

18. The mechanism as claimed in claim 6 further comprising second bearing means adapted for connection to the arm assembly for permitting relative rotation between the communicating means and the arm assembly.

19. The mechanism as claimed in claim 6 wherein said spring support means includes a second end member disposed along the longitudinal axis and wherein said mechanism further comprises locking means mounted on said communicating means for preventing movement of said second end member along the longitudinal axis, said compression spring being preloaded between the end member and the second end member.

* * * * *